US008827602B2

(12) United States Patent
Fouquer

(10) Patent No.: US 8,827,602 B2
(45) Date of Patent: Sep. 9, 2014

(54) CUTTING INSERT HAVING A CHIP DEFLECTOR

(75) Inventor: Richard Fouquer, Saint-Cyr-sur-Loire (FR)

(73) Assignee: Safety, Sevres (FR)

( * ) Notice: Subject to any disclaimer, the term of this patent is extended or adjusted under 35 U.S.C. 154(b) by 1030 days.

(21) Appl. No.: 12/921,748

(22) PCT Filed: Mar. 10, 2009

(86) PCT No.: PCT/IB2009/000479
§ 371 (c)(1),
(2), (4) Date: Sep. 9, 2010

(87) PCT Pub. No.: WO2009/112931
PCT Pub. Date: Sep. 17, 2009

(65) Prior Publication Data
US 2011/0020077 A1    Jan. 27, 2011

(30) Foreign Application Priority Data

Mar. 10, 2008 (FR) ..................................... 08 01285

(51) Int. Cl.
*B23C 5/22* (2006.01)
*B23C 5/28* (2006.01)

(52) U.S. Cl.
USPC .......................................... 407/113; 407/35

(58) Field of Classification Search
CPC ............ B23B 2240/04; B23B 2250/12; B23C 2200/086; B23C 2200/087; B23C 2200/08; B23C 5/205
USPC .................. 407/100, 108, 114, 66, 67, 87
See application file for complete search history.

(56) References Cited

U.S. PATENT DOCUMENTS

| 3,673,657 | A | * | 7/1972 | Gustafson et al. ............. 407/108 |
| 4,561,810 | A | * | 12/1985 | Ohno .............................. 407/118 |
| 4,915,548 | A | | 4/1990 | Fouquer et al. |
| 5,044,840 | A | | 9/1991 | Fouquer et al. |
| 5,437,522 | A | * | 8/1995 | Satran et al. ..................... 407/42 |
| 6,149,355 | A | | 11/2000 | Fouquer et al. |
| 6,769,844 | B2 | * | 8/2004 | Waggle ......................... 407/114 |
| 7,604,440 | B2 | | 10/2009 | Fouquer |
| 7,607,868 | B2 | * | 10/2009 | Noggle .......................... 407/113 |
| 7,726,914 | B2 | | 6/2010 | Fouquer |
| 7,806,632 | B2 | | 10/2010 | Fouquer |
| 8,033,764 | B2 | * | 10/2011 | Noggle .......................... 407/113 |
| 8,371,774 | B2 | * | 2/2013 | Zastrozynski ................ 407/113 |
| 8,434,975 | B2 | * | 5/2013 | Choi et al. ..................... 407/114 |
| 2004/0109733 | A1 | | 6/2004 | Fouquer |
| 2007/0217875 | A1 | | 9/2007 | Fouquer |
| 2008/0138160 | A1 | | 6/2008 | Fouquer |
| 2008/0199264 | A1 | | 8/2008 | Fouquer |
| 2010/0303561 | A1 | | 12/2010 | Fouquer |
| 2011/0020077 | A1 | | 1/2011 | Fouquer |

FOREIGN PATENT DOCUMENTS

| AT | 364421 T | 6/1993 |
| AT | 259687 T | 3/2004 |
| AT | 538892 T | 1/2012 |
| CN | 101098767 A | 1/2008 |

(Continued)

*Primary Examiner* — Will Fridie, Jr.
(74) *Attorney, Agent, or Firm* — IP Attorneys Group, LLC

(57) ABSTRACT

A tool holder having a cutting insert comprising an upper face having a pair of protruding surfaces, i.e. an abutment surface for clamping of the insert by means of a screw in a tool holder, and a deflection surface for deflecting chips away from the screw.

19 Claims, 5 Drawing Sheets

(56) References Cited

FOREIGN PATENT DOCUMENTS

| | | |
|---|---|---|
| CN | 101687258 A | 3/2010 |
| CN | 101998891 A | 3/2011 |
| DE | 3841320 A1 | 6/1989 |
| DE | 10207768 | 11/2000 |
| EP | 1426128 A1 | 6/2004 |
| EP | 1725361 A1 | 11/2006 |
| EP | 1737597 A1 | 1/2007 |
| EP | 1888282 A1 | 2/2008 |
| EP | 2148755 A2 | 2/2010 |
| EP | 2268439 A1 | 1/2011 |
| EP | 1814684 B1 | 12/2011 |
| ES | 2383980 T3 | 6/2012 |
| FR | 2624414 A1 | 6/1989 |
| FR | 2791587 A1 | 10/2000 |
| FR | 2785838 B1 | 12/2000 |
| FR | 2794043 A1 | 12/2000 |
| FR | 2847838 B1 | 1/2006 |
| FR | 2867708 B1 | 6/2006 |
| FR | 2866583 B1 | 4/2007 |
| FR | 2894858 A1 | 6/2007 |
| FR | 2876604 B1 | 4/2008 |
| FR | 2864799 B1 | 11/2008 |
| FR | 2916150 B1 | 7/2009 |
| FR | 2928284 B1 | 6/2010 |
| GB | 2213408 A | 8/1989 |
| IT | 1228100 B | 5/1991 |
| JP | H02139104 A | 5/1990 |
| JP | 2008526535 A | 7/2008 |
| KR | 20070094018 A | 9/2007 |
| PT | 1814684 E | 3/2012 |
| SE | 8804387 L | 12/1988 |
| WO | WO0066305 | 11/2000 |
| WO | WO03084703 | 10/2003 |
| WO | 2005089993 A1 | 9/2005 |
| WO | 2005089994 A1 | 9/2005 |
| WO | 2006040484 A1 | 4/2006 |
| WO | WO2007085281 | 8/2007 |
| WO | 2008155484 A3 | 2/2009 |
| WO | 2009112931 A1 | 9/2009 |

\* cited by examiner

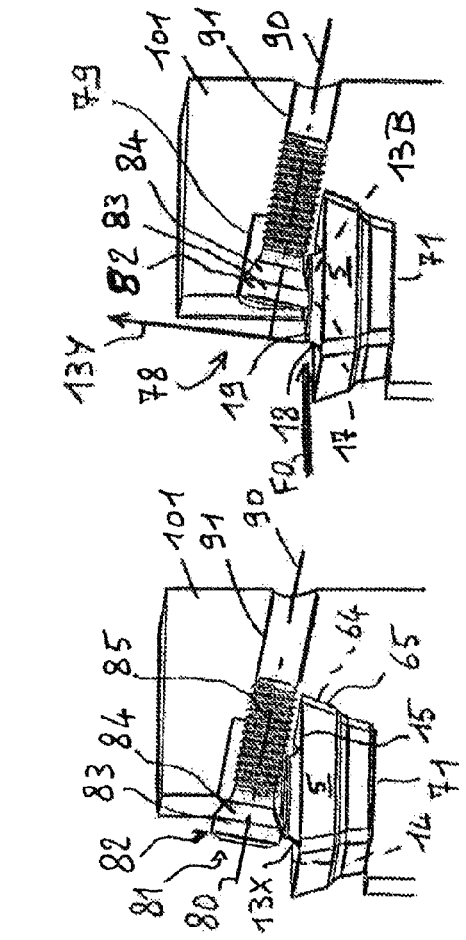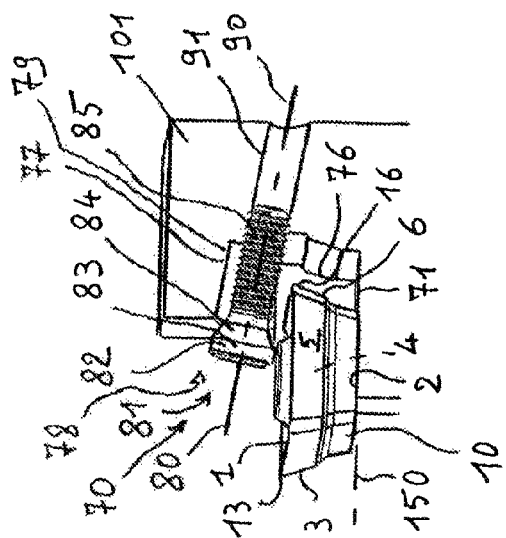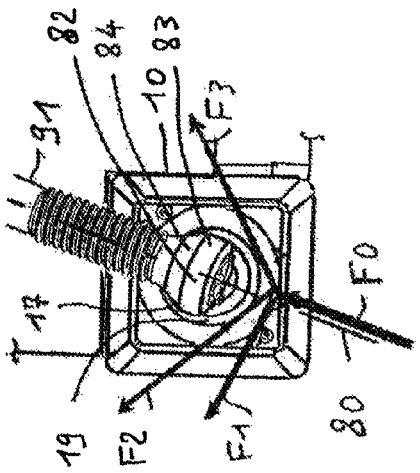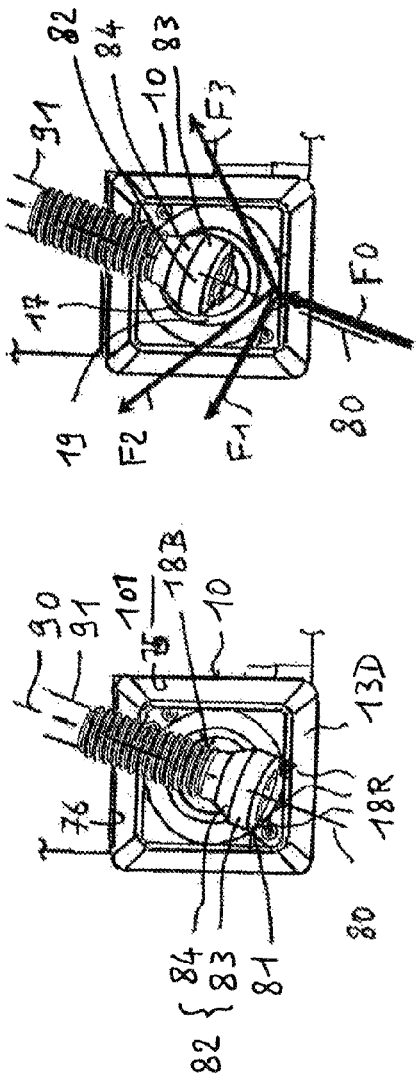
FIGURE 4
FIGURE 5
FIGURE 6
FIGURE 7
FIGURE 8

CUTTING INSERT HAVING A CHIP DEFLECTOR

CROSS REFERENCE TO RELATED APPLICATIONS

This application is a national phase filing of International Application No. PCT/IB2009/000479 filed on Mar. 10, 2009 titled "CUTTING INSERT HAVING A CHIP DEFLECTOR", which claims priority of French Patent Application No. 0801285 filed on Mar. 10, 2008. The contents of the above-identified Applications are relied upon and incorporated herein by reference in their entirety.

BACKGROUND OF THE INVENTION

The present invention relates to cutting inserts.

A cutting insert must be precisely positioned on a tool holder in order to accurately machine a workpiece and also to avoid setting up stresses that may damage the cutting insert and the associated clamping member.

There are several types of devices for clamping the insert in a pocket of the tool holder. In general, the principle of each type of device sets out to facilitate the operation of setting up and removing the cutting insert, while seeking to safeguard against any improper installation, i.e., to avoid clamping the insert in a wrong position.

The pocket has a generally flat bottom surface, which thus defines the operational plane of the cutting insert, forming a bearing surface on which the insert will initially be able to slide to abut on two alignment walls, respectively, lateral or longitudinal which define a corner which defines a functional position. It may however be provided for the rear wall to have two mutually inclined sections which together define a corner, with a re-entrant or salient interior angle.

One way of shifting the insert is to push it back into a rear corner bounded by the two alignment walls which will align it, using a sliding member bearing on the tool holder. For example, a "horizontal" screw is provided, i.e. with the body thereof housed in a threaded hole in the tool holder with an axis parallel to the bottom surface and consequently also to the upper face of the cutting insert, so that the head "skims over" the top of the cutting insert while being urged backwardly the direction of this rear corner so that the underside of the head, which forms a radial protrusion abuts against a front abutting surface of the insert, in other words directed away from the rear corner, thereby urging the insert into the rear corner. To further effectively push the insert right up against the bottom surface over which it has slid, the front surface is usually a ramped surface, which consequently introduces a component for pushing it firmly up against the bottom surface of the pocket.

Another conventional solution is to provide a "vertical" screw freely passing through a central hole connecting the top and bottom faces of the insert, so that the underside of the head thereof descends while bearing against a rear section of the countersunk mouth of the hole in order to exercise, by a rearwardly-directed wedging effect, a force urging it into the rear corner and clamping it against the bottom surface.

The manufacture of cutting inserts having a through hole for a positioning and clamping screw nevertheless raises problems of quality. Indeed, the cutting insert is formed by sintering from a powdered metal material that is poured into a mold to achieve the desired filling level corresponding to a thickness of the desired insert. To avoid having to drill the hole after sintering the practice is to introduce in its place in the powder, a conical headed calibrated rod which forms a reserve corresponding to a mouthpiece for receiving a clamping screw head.

As the head of the rod is driven under force into the powder, it creates a strong compaction of the powder grains in a virtual volume constituting the conical wall of the mouth of the hole. During sintering, this non-homogeneity of the density of the material leads to a lack of homogeneity of mechanical properties, such as coefficient of thermal expansion. Now, a cutting insert is subject to large amplitude thermal cycles during use. It can consequently happen that the wall of the hole splits, especially in the case of inserts of small size, since a proportionate reduction in the diameter of the clamping screw cannot be applied, as at least a certain thread pitch must be preserved to ensure the thread has an effective height and retains a certain stiffness.

Another problem is the fact that chips, which are sliding backwardly over a rake face forming a front edge of the upper face, originating from a leading cutting edge bounding this rake face, strike the top of the screw head and damage in particular the slot or equivalent recess for screwing.

BRIEF SUMMARY OF THE INVENTION

The present invention sets out to provide a solution to at least one of these two problems, that of insert fragility and damage to the screw head or equivalent.

To this end, the present invention provides firstly a cutting insert comprising a lower face, adapted to be installed against a bottom of a pocket forming part of a tool holder, an opposing upper face having a front edge region that constitutes a rake face for chips produced by an associated front cutting edge, and having a rear side surface, for alignment of the cutting insert in a mounting position against a rear wall of said pocket, wherein a pair of surfaces disposed on a common protrusion extends from said upper face, said surfaces comprising an abutment surface for driving the insert by a traveling member of the tool holder to the mounting position and, forwardly thereof, a deflecting surface for deflecting the path of chips away from a direction running from a rear edge of the rake face to said abutment surface for driving the insert to the mounting position.

Thus, the cutting insert is compact, since it does not require the existence of a clamping hole, and, in use, the path of the chips is deviated to avoid them reaching the traveling member, i.e. the head of a clamping screw or equivalent bearing against the abutment surface.

Preferably, the deflecting surface extends to a level above the front cutting edge.

Thus, advantageously it is ensured that the chips formed by the cutting edge are deflected and do not come into contact with the clamping device implemented.

In particular, when the cutting insert is clamped by a traveling member the head of which cooperates with the abutment surface for driving the cutting insert, the fact that the deflecting surface extends to a level above the front cutting edge ensures that chips formed by the front cutting edge do not touch the head of the traveling member. Preferably, the abutment surface for driving the insert to the mounting position is located closer to the rear side than to the front cutting edge.

The head of the clamping screw or equivalent will consequently be as far away as possible from the cutting edge, from which chips are issuing, i.e. that the screw head may, when mounted, come as close as possible to the body of the tool holder and even come to be housed therein, together with a region of the rear edge of the cutting insert. The rear region of the pocket of the tool holder can then include an upper wall to form a pocket or slot from which the cutting insert protrudes essentially via the rake face.

Furthermore, the pair of surfaces is disposed on a common protrusion.

Thus, the cutting insert is arranged to have a plurality of pairs of said rear alignment side surfaces and rake faces with a cutting edge, to offer a corresponding set of angular mounting positions, in which the said common protrusion has a lateral profile which exhibits said pair of surfaces having a protrusion at least at one of a plurality of annular segments, thereby forming, overall, a ridge line defining a crater having an inner side exhibiting a said plurality of said abutment surfaces for driving the insert to the mounting position and with an outer side exhibiting a plurality of said deflecting surfaces.

In a very simple embodiment, a ring has a rectilinear lateral profile, in other words a fixed height ridge line. The ridge line can be a simple ridge line or a ridge region forming a planar ring or a ring with a rounded surface, thereby having a certain radial extension, connecting a internal sloping side to an external sloping side. In plan view, the ring should exhibit, in the angular sense, a plurality of segments that are identical, in other words having the same basic pattern for each segment. This can take the form of a circular shape or a shape having small faces such as an equilateral triangle, a square, a hexagon or other shapes of this type. It can nevertheless be contemplated for the various angular mounting positions not to be all mutually offset by the same angular step, meaning that the regular shapings indicated above would then need to be deformed in order to adapt them to the various angular pitches.

The deflecting surface advantageously comprises at least a chip splitting feature for chip splitting. These are cut into adjoining strips which, being thus smaller in width, have less stiffness and occupy less space and can more easily be ejected.

The deflecting surface may in particular include a plurality of said chip splitting features with different orientations, so that paths of deviation of the chips will not be parallel, and preferably will be diverging paths.

The invention also provides a tool holder equipped with a cutting insert according to the invention, comprising a pocket having a bottom surface, receiving the cutting insert and a side wall adapted to co-operate with and align the rear side wall of the insert and having a hole providing guidance in translatory motion, in a specified direction, of a body of a traveling member, a head of which includes a radial protrusion adapted to abut against said driving abutment surface of the insert characterized by the fact that a direction of the guide hole, running towards the alignment wall is inclined downwards with respect to a plane of general extension of the bottom surface of the pocket and the protrusion of the head of the traveling member is of limited size, in order to allow it pass over said deflection surface without coming into contact therewith, and yet sufficient for it to land on the abutment surface providing driving for driving the insert to the mounting position.

Such clamping assembly is very compact because the path of the traveling member is near the upper face of the cutting insert, meaning that for instance one can arrange a large number of such mountings in ring like fashion on a cutter, notably a greater number than with assemblies known from the prior art.

Preferably, the deflecting surface of the cutting insert is shaped to deflect chips formed by the front cutting edge out a path towards the head of the traveling member.

The pocket advantageously includes a ceiling to form a pocket the depth of which is greater than a distance between the rear alignment side surface and the abutment surface, the latter being consequently housed in the pocket.

The ceiling can include an open volume for passage of the lateral protrusion of the traveling member enabling it to reach said abutment surface.

Preferably, the guide hole extends in a manner such that the traveling member passes practically tangentially over an upper edge of the rear side of the cutting insert.

Advantageously, the pocket further includes a longitudinal, radially and axially rear wall, and the guide hole is oriented so that the lateral protrusion of the head of the traveling member in abutment against the abutment surface, exerts a force on the cutting insert directed towards the bottom surface, the side surface and the longitudinal, radially and axially rear wall.

Preferably, the lateral protrusion of the head of the traveling member, abutting against the driving abutment surface of the insert, locks the cutting insert against the bottom surface, the side wall and the longitudinal, radially and axially rear wall.

Advantageously, the peripheral surface of the tool holder located above the cutting insert, is set back from the peripheral surface of the tool holder, located below the cutting insert, the amount of setting back being at least equal to half the length of the cutting insert between the front cutting edge and rear side surface thereof.

By this means, the body of the tool holder is also protected against projection of chips formed by the cutting edge.

Advantageously, the tool holder includes a longitudinal channel adapted to supply a channel provided in the member imparting sliding with a lubricating fluid so that the latter acts as a nozzle.

The clamping traveling member, which is for instance a screw, consequently acts also as a nozzle for ejecting lubricating fluid onto the upper face of the cutting insert, in other words in the region of the cutting edge. It will be noted that such a member for imparting sliding and forming a nozzle can also be provided in the tool holder which does not comply with the invention.

The invention also provides a tool holder fitted with a cutting insert, the cutting insert having a lower face, adapted to be installed at a bottom of a pocket of the tool holder, opposing an upper face having a front cutting edge, and including a rear side surface for alignment of the cutting insert in a mounting position against a rear wall of said pocket, an abutment surface of said cutting insert for abutment of a traveling member of the tool holder, said abutment surface upstanding from said upper face, said pocket including a hole for guidance in translatory motion along a determined direction of a body of said traveling member, a head of which includes a radial protrusion designed to come in abutment against said abutment surface of said cutting insert in order to wedge the cutting insert against the base of said pocket, said tool holder including a longitudinal channel adapted to supply a channel provided in said traveling member with a lubricating fluid so that the latter acts as a nozzle.

Thus, advantageously, lubrication of the cutting edges is achieved through a nozzle located in close proximity to the cutting edge. This positioning of the nozzle allows for better lubrication of the cutting edge. In particular, this positioning of the nozzle provides a spray of lubricant directed towards the cutting edge exhibiting higher pressure. The pressure of the spray lubricant helps remove chips from the cutting edge.

BRIEF DESCRIPTION OF THE SEVERAL VIEWS OF THE DRAWINGS

The invention will be better understood from the following description of an embodiment of a cutting insert according to the invention and a corresponding tool holder with reference to the accompanying drawings, in which:

FIGS. 4, 5, 6 are side views in section of a pocket in the cutter receiving the insert when it is being mounted using a screw to drive it slidingly and for final clamping.

FIGS. 7 and 8 are respectively an upper view of the insert before clamping in the pocket, corresponding to FIGS. 4 and 5, and the same view at the final mounting position corresponding to FIG. 6.

DETAILED DESCRIPTION OF THE INVENTION

Figure 1:
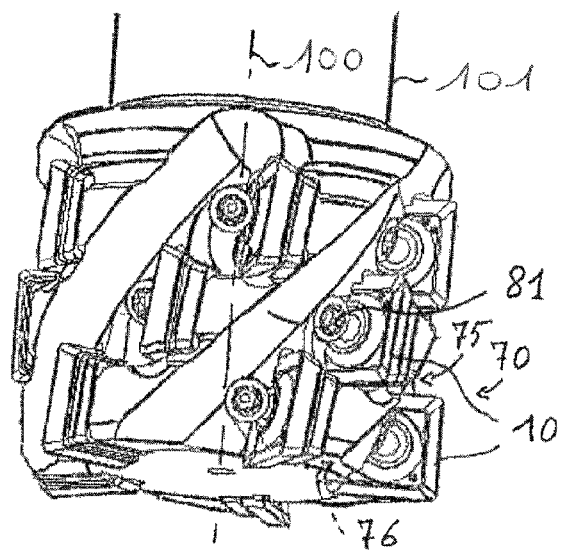
FIG. 1 is a side view in perspective of a profiling cutter with a plurality of cutting inserts according to the invention.
Figure 2:
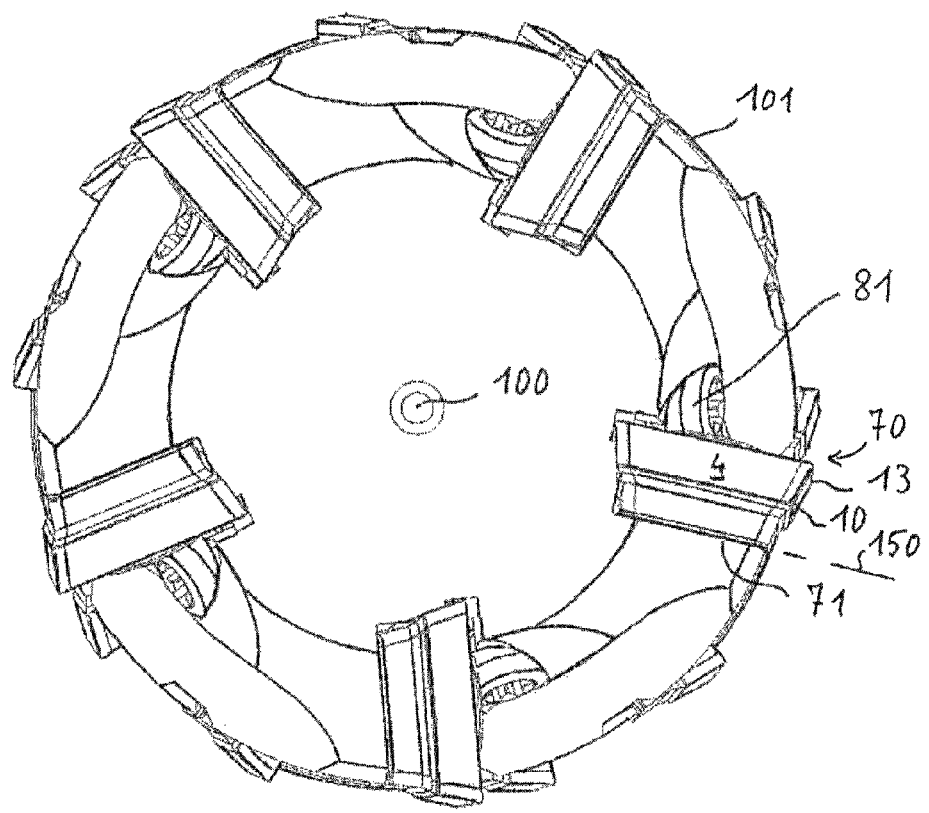
FIG. 2 is an enlarged front view of the cutter of FIG. 1.

FIGS. 1 and 2 show a tool holder which is in the form of a rotary cutter 101, with rotation symmetry about a central axis 100, and including at a front end (FIG. 2) thereof, a head formed by a plurality of, here, five identical pockets, all referenced 70, distributed equi-angularly. Each pocket 70 comprises a slot-like seat extending in a generally axial plane separated by 72° from an adjacent pocket 70. The pocket 70 has a horizontal bottom 71, or base, which is here called "horizontal" because it extends in a plane 150 having a substantially radial direction of extension relative to the rotational axis 100.

With reference to FIGS. 4 to 8, a head 82, of a driving and final clamping screw 81 includes an end operating section of circular cross-section 83, here with a cylindrical envelope surface, which continues to a tapered neck portion 84 connecting to a threaded body 85 having an axis 80 (FIG. 4). Threaded body 85 is engaged with a threaded hole 91 formed in the cutter 101 and having an axis 90, in order to cause a sliding movement of a cutting insert 10, substantially radially with respect to the rotational axis 100, over the bottom 71 to bring it to a predetermined mounting position aligned in the pocket 70 and as shown in FIGS. 1 and 2. Preferably, in this mounting position, the cutting insert rests with along substantially the entire lower surface thereof on the bottom 71 of pocket 70.

FIG. 1 shows that in this example, three such pockets with cutting inserts 10; a front, middle and rear one, are provided to occupy axially staggered positions and they are mutually offset angularly about the rotational axis 100.

Figure 3:
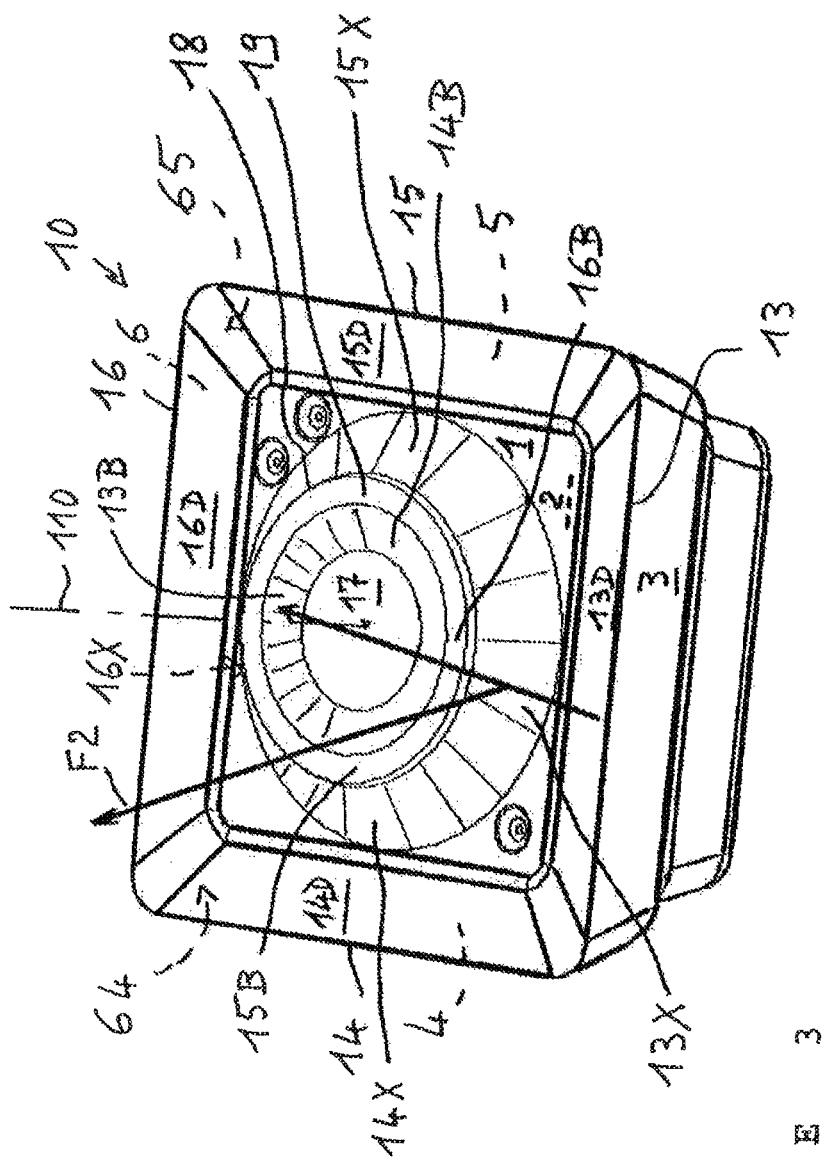
FIG. 3 is an enlarged top view in perspective of such a cutting insert.

With reference to FIG. 3, and also to FIGS. 4, 5, 6, 7 and 8, it can be seen that the insert 10 which here exhibits a profile which is generally square in plan view (FIGS. 7 and 8) comprises an upper face 1, opposite a lower face 2 supposed to bear against the bottom 71 of pocket 70, and a plurality of sides, here consequently four in number; namely a front side 3, two longitudinal or lateral sides 4 and 5 (the latter visible in FIGS. 4, 5, 6), also called left-hand and right-hand, respectively, which are connected by a respective left-hand corner edge 64 and right-hand corner edge 65, substantially vertical to a rear aligning side 6.

The insert 10 shown is of the indexable type, i.e. it is able to be mounted at any one of four possible orientations separated pairwise by 90 degrees. The upper face 1 has a perimeter forming four strip-like surfaces for chip forming 13D, 14D, 15D, 16D defining together with each respective side 3, 4, 5, 6, a front 13, left-hand 14, right-hand 15 and rear 16 horizontal cutting edge, respectively.

As each of the four sides 3 to 6 may well come to occupy a position previously occupied by another side, the terms "front", "back" and "longitudinal" here only have a relative value as a relative reference and would consequently be transposed if the insert 10 were to adopt another of the three possible angular positions. Similarly, for the sake of convenience, the plane 150 of the bottom 71 of the pocket 70 is here assumed to be horizontal, so that the horizontal and vertical directions are thus referenced with respect to the bottom 71 or the plane 150. When mounted on a non-horizontal plane 150, the present discussion would obviously still be valid after transposition to the appropriate reference frame.

FIGS. 1 and 2 show that the front cutting edge 13 is mounted with an axial orientation on the cutter 101, i.e. substantially parallel to the rotational axis 100. Note however that in the way they are being used here, the inserts 10 of the front pockets are also used for head-on cutting, i.e., in addition to a so-called front cutting edge 13 arranged to project radially, a lateral cutting edge which here is a left-hand cutting edge 14 projects axially outside of its pocket 70. The pockets 70 at a front ring of pockets are consequently open in the radial direction of the cutter 101, just like the pockets 70 of the other rings axially rearwards, but also in the axial direction. Each pocket 70 includes a right-hand longitudinal wall 75 that extends radially and axially rearwardly, and a rear wall 76 for alignment which is axial, designed to receive and align the respective right-hand 5 and rear 6 longitudinal sides.

FIG. 3 shows only the insert 10 and FIGS. 4 to 8 illustrate mounting of the insert in the pocket 70. The upper face 1 has a pair of surfaces having a protrusion which are now functional, one of which is a chip deflector 13X and the other of which forms an abutment 13B for driving the insert 10 by means of a traveling member, here the clamping screw 81, up to the predetermined mounting position where it is appropriately aligned, i.e. with the rear side 6 in aligned abutment against the rear alignment wall 76. The right-hand longitudinal side 5 is also aligned against the right-hand axially rearward longitudinal wall 75 of pocket 70, acting as an abutment surface against any tendency of the insert 10 to be pushed backwards by the forces of reaction from the workpiece being machined, as regards the front ring is concerned. In this description, the term "deflector" and "abutment" refer equally as well to the volume of material forming the protrusion and to surface topography of the protrusion performing the function thereof.

Moving rearwards from the front of the insert 10, the upper face 1 exhibits a lateral profile that includes a specific pattern. In succession there are the front cutting edge 13, the continuation of which is a strip-like rake face 13D, the front deflector 13X, the driving abutment surface 13B and the rear cutting edge 16. The forward strip-like rake face 13D, which conventionally is in the form of a slightly downward sloping ramped surface of the insert 10, may not continue to deflector 13X, i.e. that in such case, an intermediate non-functional strip is formed over which the chips will simply fly, but which will not effectively cooperate with them for guidance purposes, this function being adequately performed by the forward strip-like rake face 13D, which is located forwardly thereof. The protrusion constituting the driving abutment surface 13B should, in this example, be located at some distance from the rear cutting edge 16 for avoiding touching the rear clearance strip-like surface 16D, since the rear cutting edge 16 can be indexed to a front position.

With reference to FIGS. 6 and 8, showing a final position, the chips cut by the cutting edge 13 slide over the forward strip-like rake face 13D and reach the front deflector 13X. Preferably, as here, the front deflector 13X is not a vertical shoulder but rather a ramped rectilinear or non-rectilinear shoulder, for example with a gradually increasing slope, following for example a parabolic path, to gradually impart an oblique orientation to the path of the chips, initially almost horizontal indicated by arrow F0 over the forward strip-like rake face 13D, to progressively adopt a significantly rising direction 13Y, i.e. to deflect chips from a path following direction F0, when leaving the cutting edge 13, more specifically from the rear of strip-like rake face 13D, and going towards abutment surface 13B, and especially directed towards the top of the abutment surface 13B, i.e., the area occupied by the screw head 81. A conventional screw slot, or hexagonal or other recess, provided in the radial surface of the top of the screw head 82 is thus protected against any attack by flying metal, in particular chips.

The front deflector 13X thus substantially defines a truncated conical protecting volume above the upper face 1. The front deflector 13X is located inside said conical protecting volume in plan view. In order for the screw head 82 to be located entirely within the protected volume, the top of the conical portion, i.e. the front deflector 13X, occupies a position which is advanced to the maximum relative to the abutment surface 13B, thereby providing a section or maximum height of protected volume at the abutment surface 13B.

As is particularly visible in FIGS. 3 to 6 and 10, the front deflector 13X extends, preferably to a level above the front cutting edge 13. Thus, as can be seen particularly in FIG. 10, the chips formed by the cutting edge 13 are deflected out of a path running in the direction of the head 82 of the driving and clamping screw 81. Therefore, the chips formed by the cutting edge do not come into contact with the head 82 of the screw. Wear of the screw head 82 resulting from chips being projected onto the head is thus avoided.

To enable the desired operation at any of the four mounting positions, four of the above-captioned surface patterns or successive protrusions are present at four functional areas mutually spaced pairwise by 90° with respect to a virtual vertical axis of symmetry 110 of the insert 10, i.e. perpendicular to the center of the upper face 1.

In this example, to simplify the general shape of the protrusions, each functional area is linked to its two neighbors by a non-functional section to which a profile of said functional area is being imparted. In other words, said profile is present in every cross-sectional plane that contains the virtual axis of symmetry 110, i.e. that the forward deflector 13X and three identical deflectors 14X, 15X, 16X, mutually offset by 90 degrees, are sectors of the same first protrusion ring or annulus on the upper face 1 and, similarly, the abutment surface 13B and three corresponding abutment surfaces 14B, 15B, 16B are sectors of a same second ring or annulus. In this example, the first and second rings are two respective surfaces of the same protrusion, of ring shape and more precisely in the shape of a cone 18 hollowed out to form a central crater 17. One external sloping side of the cone 18 constitutes the first ring, carrying the deflectors 13X, 14X, 15X, 16X, and an inner sloping side 18B of the cone 18 constitutes the second ring, carrying the abutment surfaces 13B, 14B, 15B, 16B.

Note that the crater 17 of the cone can unlike the drawing lack the base surface, i.e. the inner sloping side 18B is then not a tapered circular band shape but constitutes a truly conical surface, with a vertex, here occupying a position further down, equal to or greater than a mean elevation of the various other surfaces of the upper face 1. In other words, the main cone defined by its outer surface is hollowed out by an upside-down coaxial conical crater (17).

Note that as the abutment surface 13B or 18B is concave here, precisely in the form of an arc of a circle in plan view, the path of the tapered portion 84 of the clamping screw 81 can thus be expected to reach the inner sloping side 18B in an angular sector of the ring 18 located at minimum distance from the rear wall 76 of pocket 70, i.e. the tapered portion moves along the bottom of the recess with reference to the direction of the rear wall 76 and axially with respect to the rotational axis 100. In this way, a pressure force exerted by the screw head 82 in direction 90 of the hole 91 on the concave abutment surface 13B or 18B, i.e. in a direction substantially radial to the rotational axis 100, will nevertheless exhibit, thanks to the presence of said concavity bring about a wedging or upward thrust effect at an axially rear side of the recess, such to create a component that opposes the backward axial thrust exerted by the workpiece on the left-hand cutting edge.

As every wedging effect has its maximum amplification effect when the side rake angle is small, provision can be made in order to better withstand this rearward directed axial thrust for the tapered portion 84 to initially "land" slightly axially ahead of the bottom point of said recess. The contact region at 18B is consequently no longer parallel to the bottom wall 76 (or to rotational axis 100) but rather is at a side, positioned forwardly with respect to rotational axis 100 of concave surface 18B, which is consequently slightly inclined with respect to the bottom wall 76, in other words which has moved away from rotational axis 100 to adopt a position ahead thereof. This inclination consequently makes it possible to exercise initially, when performing clamping, a force component tending to push the cutting insert 10 axially (100) forward. This inclination is nevertheless limited so that the coefficient of friction of insert 10 on pocket 70, and in particular on the rear wall 76 and base 71 which essentially are responsible for the clamping, prevents any undesired sliding thereof forwardly in the axial sense (10), while screw 81 is being tightened.

As mentioned above, the front deflector 13X is disposed at a maximum distance ahead of abutment surface 13B, and the latter is arranged to be as rearward as possible, i.e. that the cone 18 is of maximum diameter, but nevertheless compatible with the strip-like surfaces for chip forming 13D, 16D of suitable useful length, in the direction of arrow F0. As the cone 18 is centered on the vertical axis 110, the front deflector 13X and abutment surface 13B are consequently located on two different halves, respectively front and rear, of the insert 10. The abutment surface 13B is located nearer the rear side 6 than front side 3 limited by the front edge 13.

FIGS. 4 to 6 show that a ceiling 77 of pocket 70 constitutes an enlarged mouth of guide hole 91, which is wide-mouthed in its lower portion, at least in the area facing the abutment surface 13B, thereby forming a laterally-open passage volume in ceiling 77 in the form of a slot 79, whereby the lower moving of tapered portion 84 is free to abut against abutment surface 13B. Laterally of slot 79, the remainder of the ceiling 77 may present any height which is compatible with the thickness of the cutting insert 10, i.e. that the bottom of the slot 79 may constitute the whole of the portion of ceiling 71 in line with which the screw head 82 runs.

FIG. 6 shows that pocket 70 is sufficiently deep, as defined by the position of the rear wall 76, so that round about the rear half of insert 10 is dominated by ceiling 77, i.e. that the back half of the conical ring 18 is housed in a pocket 78 formed by the rear half of pocket 70, the front half of which exhibits a "deck" consisting of the front half of the bottom 71, which serves as a counter-abutment to resist reaction forces coming from the workpiece. The abutment surface 13B is consequently located well inside the seat 78, at a certain distance back from the forward edge of the ceiling 77 and the screw head 82 has a length substantially limited to this distance, so that it is almost entirely housed inside the seat 78 and consequently well protected (FIG. 8).

Screw head 82 follows an oblique path with respect to the bottom 71, specifically advancing in the latter's direction by going towards the rear wall 76, this path allowing the screw head 82 to clear the bottom of the crater 17 while intersecting or not intersecting virtual axis 110. Specifically, given the diameter of screw head 82, its path is such that the running portion thereof while it is being screwed home, at each moment the lowest portion of screw head 82 will address a summit or ridge line 19 (a surface or a simple circular ridge line) of cone 18 at an elevation at least equal to the height of this ridge line 19, in order to provide an initial margin or guard height, preferably positive, or at least zero.

Nevertheless, this initial margin is limited so that when the screw head 82 does reach an opposite (diametrically or otherwise) region of the crater 17, a second similar margin has a negative value so that the underside of the tapered portion 84 abuts against the inner side 18B of the crater 17, on the abutment surface 13B or 14B, or 158 or 168 provided respectively in the other cases of mounting. The descent angle of the path of screw head 82 is thus sufficient, given the horizontal distance for clearing the crater 17, for the first margin to be transformed into a second negative margin. Deflector 13D is consequently ineffective for the screw head 82. The cutting insert 10 is thus slidingly driven until both alignment sides, longitudinal right-hand 5 and rear 6 sides, respectively abut against the right-hand 75 and rear 76 longitudinal alignment walls. To guide the insert 10 towards the respective right-hand corner 65, the body 85 of the clamping screw 81 is guided by the threaded hole 91 with axis 90 having, in plan view (71 or 150) a direction of extension which is oblique to the right-hand longitudinal wall 75, i.e., running towards it as well as towards rear wall 76.

In this example, to ensure more effective clamping, the ceiling wall 77 is relatively low, i.e. that the upper face 1 of cutting insert 10 is close to the ceiling 77. As the running portion of cylindrical portion 83 which at any given instant occupies the topmost position comes to bear, through bending of the screw 81 against the ceiling 77, but this only after the conical portion 84 has reached the abutment surface 138 on the abutment ring of inner sloping side 18B. Thus, as screwing down is continued, but now with a view to clamping following the sliding without clamping, conical portion 84 of screw head 82 slidingly mounts, by a wedging effect, inner sloping side 18B under a ramping action. The bending of screw 81 caused by the reaction force of inner side 18B, is limited because the running topmost portion of cylindrical portion 83 then comes to abut against the ceiling 77. Of course, the ceiling area 77 located on the side of the opening of pocket 70 does have the desired height, or at least a channel or passageway 49 for free passage on the occasion of initial tightening of screw head 82, since, as indicated, its trajectory is downward and consequently has a maximum height in the position for which the screw 81 is in the un-screwed state.

Alternatively, the clamping screw 81 can be replaced by a traveling member that includes a body that is free to move rectilinearly (axis 90) or along an arc of a circle guided by the hole 91, and having a lower lateral engagement member for clamping, and possibly an upper protrusion designed to abut against the ceiling 77 after bending of the body or transversal disc that incorporates both of these if the traveling member is rectilinear and rotative, i.e. having the profile of a nail. A lateral ratchet member is then used to lock the member imparting sliding in the position of clamping of insert 10.

Alternatively again, the traveling member can be replaced by a clamping part with a clamping nose adapted to follow an essentially downward trajectory, for instance a sort of lever, adapted to exercise, on abutment surface 13B, a force urging cutting insert 10 against the bottom 71 and by a wedging effect, a force adapted to maintain registration, having two components directed respectively towards the longitudinal right-hand 75 and rear 76 walls.

Alternatively, said ring shape is replaced by an overall square shape when viewed from above, and offset angularly by a half-step, i.e. 45 degrees, with respect to the plan view profile of insert 10. Thus, each corner of the square will face a point halfway along the facing cutting edge 13, 14, 15, 16. The chips (FIG. 10) produced by the active cutting edge 13 will then come to abut against the corresponding corner forming a sort of pointed ram or chip splitting feature onto which the chips get "impaled", i.e. that they get split into two half way along. This also holds in the case of a cutting insert 10 having one single mounting position, so having only one deflector 13X.

In general, referring to FIG. 3 or 7, the ring shape can be modified somewhat, more precisely can be crenellated, by adding four sets of each N such pointed chip splitting features 18R (a single set is shown, for N=3), to split the chips width-wise into N+1 thin strips. In particular, as each chip splitting feature 18R is defined by two mutually inclined surfaces separated by a ridge descending forwardly up to substantially the forward strip-like rake face 13D, the chip splitting features 18R at the edge, at the extremities of the assembly considered, can be partially directed outwardly, in other words towards the neighboring longitudinal side 4 or 5, so that the thin strip of a chip that they have been responsible for detaching moves away laterally from the others. The chip splitting features 18R of each set can thus be arranged in an arc of a circle as illustrated, while for example retaining the overall shape of the conical ring 18, so that each set will increasingly deflect laterally the paths along which the chips as the end of the set is progressively approached. The horizontal arrow F0 of the trajectory of incoming chips directed backwardly will be transformed into three arrows for deflection directed upwardly, i.e. lateral arrows F1 and F3 (FIG. 8) which are thus divergent, in plan view, compared to an arrow F2 for central deflection, one particular case of arrow 13Y, giving a general indication of the deflection. The path the chips arrive along which is directed backwardly in the direction of arrow F0, parallel to the direction of extension of longitudinal sides 4 and 5, consequently gets transformed, after reflection at all N chip splitting features 18R into a plurality of N+1 ascending and diverging paths, thereby defining a protected volume of overall shape of a more or less flattened semi-cone depending on how effective it is, i.e., the respective angle, and lateral and vertical deflections.

The thin strips of marginal chips following a trajectory of arrows F1 or F3, are consequently also discharged upwardly, possibly with a gradient of their ascending path which is smaller than that of the central thin strips indicated by the central arrow F2, that is, the whole set of N+1 paths actually covers less of the surface of the semi-cone above. In one particular case, the slopes of the various chip splitting features 18R are harmonized so that all paths F1 to F3 have the same upward slope, possibly with a rear offset (arrows F1 and F3) for the thin strips that have been deflected by the most lateral chip splitting features 18R as such a lateral chip splitting feature 18R is located a little farther from the front cutting edge 13 than are the central chip splitting feature(s) 18R.

Figure 9:
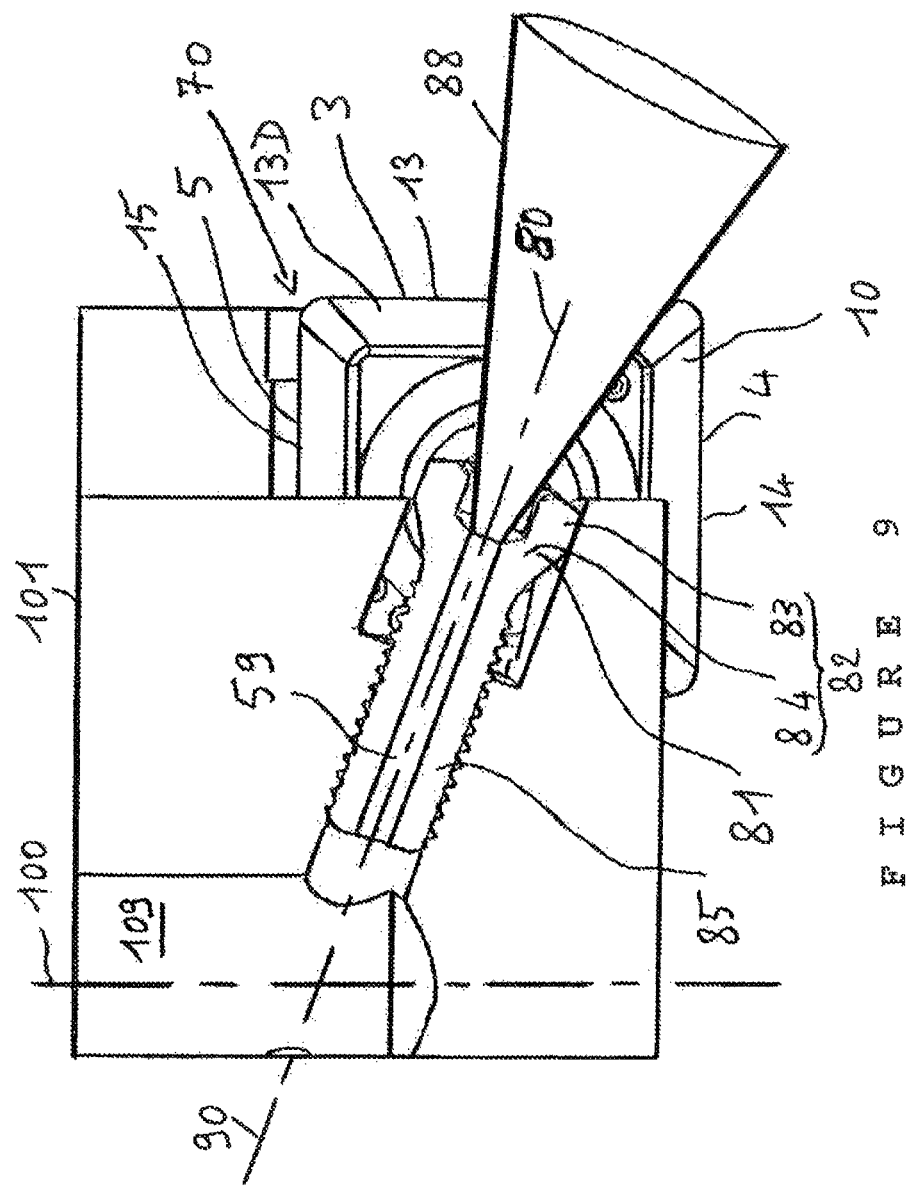
FIG. 9 is a plan view showing the upper face of the cutting insert pressed against the bottom of the pocket by the clamping screw that also includes a channel for lubricating the cutting edge of the insert, supplied from an axial channel formed in the body of the cutter.
Figure 10:
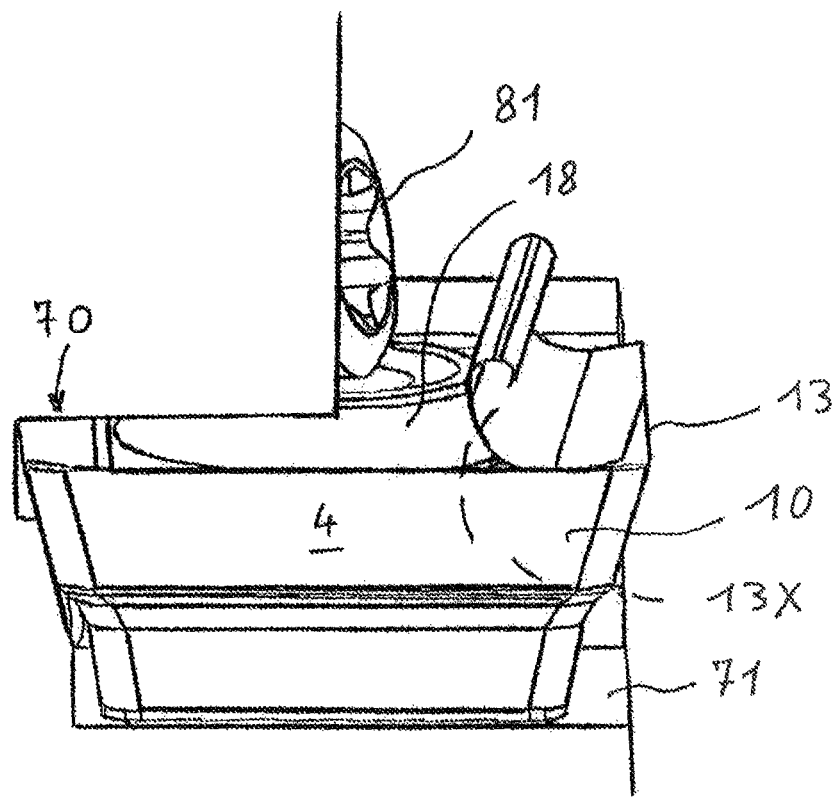
FIG. 10 is a side view of the cutting insert cutting a chip.

For the purpose of lubricating the cutting edge 13, FIG. 9 shows that the hole 91 for guiding and securing the screw 81 communicates with a longitudinal channel 109, common to all the pockets 70, formed in the body of the cutter 101 here centered on the axis of rotation 100 to avoid weight imbalance. The screw 81 is provided axially from end to end, with an axial channel 59. The common channel 109 is supplied with lubricating fluid for the various cutting inserts 10 via a rotary seal (not illustrated) arranged at a rear end of the cutter body 101, either in the form of an end cap or a U-profile collar or equivalent with the two free ends of both branches forming sealing lips which are applied against a cylindrical body section of the cutter 101 in which one or several somewhat radial passages have been provided meeting up with the common channel 109. The collar is supplied under pressure in order to overcome the centrifugal force opposing injection in the direction of axis 100 and overcome loss of pressure head in the channels 59 of screw 81.

As shown by the virtual cone, with axis 90, referenced 88 in FIG. 9, the lubricating fluid is consequently ejected by the clamping screw 81, thus acting as a lubrication nozzle, at the upper face 1 of the cutting insert 10, and centrifugal force ejects this fluid directly towards the strip-like rake face 13D, and therefore towards the then active cutting edge 13.

It will be noted that this arrangement of canals for supplying lubricating fluid may also be provided in any other assembly outside the context of this invention, since the front deflector 13X is not involved in this lubrication. It is sufficient for insert 10 to be clamped by an abutment element at its upper face 1 and be connected to the cutter body 101 having a channel to act as a nozzle. For example, as mentioned, the screw 81 could be replaced by a non-threaded traveling member that includes a lateral protrusion such as a channel, adapted to be blocked in a clamping position by a locking member such as the nose of a lateral screw forming an end pin. Such a traveling member, which is not rotary and having any desired cross-sectional shape, can also have a profile which is an arc of a circle, the passage with axis 91 having a corresponding profile.

What is claimed is:

1. A cutting insert comprising:
   a lower face, adapted to be installed against a bottom of a pocket forming part of a tool holder,
   an opposing upper face having a front edge region that constitutes a rake face for chips produced by an associated front cutting edge,
   a rear side, for alignment of the cutting insert in a mounting position against a rear wall of said pocket,
   wherein a pair of surfaces disposed on a common protrusion extends from said upper face, said pair of surfaces comprising an abutment surface for driving the insert by a traveling member of the tool holder to the mounting position and, forwardly thereof, a deflecting surface for deflecting the path of chips away from a direction running from a rear edge of the rake face to said abutment surface for driving the insert to the mounting position, wherein said common protrusion has a lateral profile which exhibits said pair of surfaces at least at one of a plurality of annular segments, thereby forming, overall, a ridge line defining a crater having an inner side exhibiting a plurality of abutment surfaces for driving the insert to the mounting position and having an outer side exhibiting a plurality of deflecting surfaces.

2. The cutting insert according to claim 1, wherein the deflecting surface extends to a level above the front cutting edge.

3. The cutting insert according to claim 1, wherein the abutment surface for driving the insert to the mounting position is located closer to the rear side than to the front cutting edge.

4. The cutting insert according to claim 1, wherein the cutting insert has a plurality of pairs of said rear sides and rake faces with a cutting edge, to offer a corresponding set of angular mounting positions.

5. The cutting insert according to claim 1, wherein the deflecting surface has at least one chip splitting feature for splitting the chips.

6. The cutting insert according to claim 5, wherein the deflection surface has a plurality of said chip splitting features having different orientations.

7. A tool holder comprising a tool holder having a pocket, and a cutting insert;
   the cutting insert having a lower face opposing an upper face at which a front edge region constitutes a rake face for chips produced by an associated front cutting edge, and having a rear side, for alignment of the cutting insert in a mounting position against a rear wall of said pocket, wherein a pair of surfaces are provided protruding from said upper face, said pair of surfaces comprising an abutment surface for driving the insert by a traveling member of the tool holder to the mounting position and, forwardly thereof, a deflecting surface for deflecting the path of chips away from a direction running from the rake face to said deflecting surface, the pocket having a bottom surface, receiving the cutting insert and a side wall adapted to co-operate with and align a rear side wall of the insert and having a guide hole providing guidance in translatory motion, in a specified direction, of a body of said traveling member, a head of which includes a radial projection adapted to abut against said abutment surface of the insert, wherein the direction of the guide hole, running towards the rear side wall, is inclined downwards with respect to a plane of general extension of the bottom surface of the pocket and the lateral extension of the protrusion of the head of the traveling member is of limited size, in order to allow it pass over said deflection surface without coming into contact therewith, and yet sufficient for it to land on the abutment surface for driving the insert to the mounting position.

8. The tool holder according to claim 7, wherein the deflecting surface of the cutting insert is shaped to deflect chips formed by the front cutting edge from a path directed towards the head of the traveling member.

9. The tool holder according to claim 7, the pocket further including a longitudinal, radially and axially rear wall, and the guide hole is oriented so that the lateral protrusion of the head of the traveling member in abutment against the abutment surface, exerts a force on the cutting insert directed towards the bottom surface, the side surface and the longitudinal, radially and axially rear wall.

10. The tool holder according to claim 9 wherein the lateral protrusion of the head of the traveling member, abutting against the abutment surface for driving the insert to the mounting position, locks the cutting insert against the bottom surface, the side wall and the longitudinal, radially and axially rear wall.

11. The tool holder according to claim 7 in which the pocket has a ceiling to form a seat, the depth of which is greater than a distance between the alignment rear side surface and said abutment surface.

12. The tool holder according to claim 11, wherein the ceiling has an open volume for passage of the lateral protrusion of the traveling member enabling it to reach the said abutment surface.

13. The tool holder according to claim 7, wherein the peripheral surface of the tool holder located above the cutting insert, is set back from the peripheral surface of the tool holder located below the cutting insert, the amount of setting back being at least equal to half the length of the cutting insert between the front cutting edge and rear side surface thereof.

14. The tool holder according to claim 7, wherein the guide hole extends in a manner such that the traveling member passes practically tangentially over an upper edge of the rear side of the cutting insert.

15. The tool holder according to claim 7, comprising a longitudinal channel adapted to supply a channel provided in said traveling member with a lubricating fluid so that the latter acts as a nozzle.

16. A tool holder fitted with a cutting insert, the cutting insert having a lower face, adapted to be installed against a bottom of a pocket of the tool holder, an opposing upper face having a front cutting edge, a rear side, for alignment of the cutting insert in a mounting position against a rear wall of said pocket, an abutment surface of said cutting insert for abutment of a traveling member of the tool holder, said abutment surface upstanding from said upper face, said pocket including a hole for guidance in translatory motion along a determined direction of a body of said traveling member a head of which includes a radial protrusion designed to come into abutment against said abutment surface of said cutting insert in order to wedge the cutting insert against the base of said pocket, said tool holder including a longitudinal channel adapted to supply a channel provided in said traveling member with a lubricating fluid so that the latter acts as a nozzle.

17. The tool holder according to claim 7, wherein the deflecting surface of the cutting insert extends up to a level above the front cutting edge.

18. The tool holder according to claim 7, wherein the abutment surface for driving the insert to the mounting position is located closer to the rear side than to the front cutting edge.

19. The tool holder according to claim 7, wherein said pair of surfaces is disposed on a common protrusion.

* * * * *